(12) United States Patent
Hahn et al.

(10) Patent No.: US 9,074,073 B2
(45) Date of Patent: Jul. 7, 2015

(54) RUBBER COMPOSITION CONTAINING SILICA REINFORCEMENT AND FUNCTIONALIZED CROSSLINKS AND PRODUCTS WITH COMPONENT THEREOF

(75) Inventors: Bruce Raymond Hahn, Hudson, OH (US); Alexander Thomas Miller, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 984 days.

(21) Appl. No.: 12/631,880

(22) Filed: Dec. 7, 2009

(65) Prior Publication Data

US 2011/0136969 A1    Jun. 9, 2011

(51) Int. Cl.
C08K 3/36        (2006.01)
C08K 5/47        (2006.01)

(52) U.S. Cl.
CPC ...................................... C08K 5/47 (2013.01)

(58) Field of Classification Search
CPC .............. C08L 9/00; C08K 3/36; C60C 1/00; B60C 1/0016
See application file for complete search history.

(56) References Cited

U.S. PATENT DOCUMENTS

| | | | | |
|---|---|---|---|---|
| 4,128,510 A * | 12/1978 | Richwine | .................... | 525/331.1 |
| 5,262,488 A * | 11/1993 | Maly et al. | .................... | 525/282 |
| 5,443,104 A * | 8/1995 | Dollinger et al. | .............. | 152/510 |
| 5,567,821 A * | 10/1996 | Kuczkowski et al. | ........ | 548/126 |
| 6,090,880 A * | 7/2000 | Zimmer et al. | ................ | 524/492 |
| 6,172,138 B1 * | 1/2001 | Materne et al. | ................ | 523/212 |
| 6,180,707 B1 * | 1/2001 | Hsu et al. | ........................ | 524/382 |
| 6,894,122 B2 * | 5/2005 | Zanzig et al. | .............. | 525/331.9 |
| 7,041,825 B2 * | 5/2006 | Karol et al. | .................... | 544/359 |
| 8,053,512 B2 * | 11/2011 | Thiele et al. | .................. | 524/571 |
| 2002/0132901 A1 * | 9/2002 | Wang et al. | .................... | 524/492 |
| 2004/0014869 A1 * | 1/2004 | Wong et al. | .................... | 524/493 |
| 2005/0209370 A1 * | 9/2005 | Zhang et al. | .................... | 523/333 |
| 2006/0199917 A1 * | 9/2006 | Chino | ............................ | 525/374 |
| 2008/0139709 A1 * | 6/2008 | Piccirilli et al. | ................. | 524/99 |
| 2011/0136969 A1 * | 6/2011 | Hahn et al. | ..................... | 524/572 |

FOREIGN PATENT DOCUMENTS

| | | | | |
|---|---|---|---|---|
| EP | 643101 | 3/1995 | .............. | C08L 23/28 |
| EP | 796890 | 9/1997 | .............. | C08K 5/47 |
| EP | 0796890 A1 * | 9/1997 | | |
| EP | 829511 | 3/1998 | .............. | C08K 9/02 |

OTHER PUBLICATIONS

Hi Sil 233 Data Sheet. Obtained online on Aug. 27, 2012 from ppg.com. No Author, copyright 2008.*
Silquest A-189 Data sheet. Obtained online on Aug. 27, 2012 from http://www.biryong.co.kr/datacenter/chemistry/Silquest(R)A189Silane.pdf. No Author, copyright 2002.*
1,3-butadiene sheet from Dow Chemical. No Author, No Date. Obtained Mar. 9, 2013 from http://www.dow.com/hydrocarbons/c4/prod/buta.htm.*
European Search Report completed Feb. 7, 2011.

* cited by examiner

*Primary Examiner* — Michael Pepitone
*Assistant Examiner* — Michael A Salvitti
(74) *Attorney, Agent, or Firm* — Richard B. O'Planick

(57) ABSTRACT

The invention relates to a rubber composition which contains silica reinforcement and functionalized crosslinks, particularly crosslinked functionalized precipitated silica, including sulfur crosslinked functionalized silica and associated cured rubber compositions, and to articles of manufacture having a component thereof such as, for example tires. A dimercaptothiadiazole is used to form the crosslinked network within the rubber composition. The mercapto moieties of said dimercaptothiadiazole are desirably protected from prematurely reacting with, for example, diene-based elastomers and sulfur-containing silica coupling agents by pre-reaction with an aromatic carboxylic acid chloride or by reacting in situ with an aromatic carboxylic acid.

8 Claims, No Drawings

RUBBER COMPOSITION CONTAINING SILICA REINFORCEMENT AND FUNCTIONALIZED CROSSLINKS AND PRODUCTS WITH COMPONENT THEREOF

FIELD OF THE INVENTION

The invention relates to a rubber composition which contains silica reinforcement and functionalized crosslinks, particularly functionalized crosslinks capable of interacting with precipitated silica which is also sulfur crosslinked with its associated cured rubber compositions, and to articles of manufacture having a component thereof such as, for example tires. A dimercaptothiadiazole is used to form the crosslinked network within the rubber composition. The mercapto moieties of said dimercaptothiadiazole are desirably protected from prematurely reacting with, for example, diene-based elastomers and sulfur-containing silica coupling agents by pre-reaction with an aromatic carboxylic acid chloride or by reacting in situ (within the rubber composition) with an aromatic carboxylic acid.

BACKGROUND OF THE INVENTION

Rubber compositions typically contain reinforcing fillers which may, for example, include synthetic amorphous silica (e.g. precipitated silica) as well as rubber reinforcing carbon black.

Various products are manufactured which have at least one component comprised of such rubber compositions such as, for example, tires.

In order to enhance rubber reinforcing effects of precipitated silica, a coupling agent is typically used in combination with the precipitated silica.

Such coupling agent typically contains a moiety (e.g. alkoxysilane group) reactive with hydroxyl groups (e.g. silanol groups) on the precipitated silica and another different moiety (e.g. polysulfide as a sulfur contributing moiety) interactive with elastomers containing carbon-to-carbon double bonds (e.g. diene-based elastomers).

Also, various functionalized elastomers are sometimes used in combination with precipitated silica reinforcement of the rubber composition where the functionalized elastomers contain functional groups which are interactive with the precipitated silica to thereby enhance a reinforcing effect of the silica for the rubber composition.

In practice, such functionalized elastomers are prepared by adding functional groups to the polymer chain of the elastomer, for example, adding a functional group to live terminal ends of the polymer chain during its formative monomer polymerization. The functionalized elastomer is then added to the rubber composition.

For this invention a very different approach is proposed, namely, addition of a dimercaptothiadiazole compound which contains a functional group to a rubber composition which contains precipitated silica and silica coupler where the functional group interacts in situ (interacts within the rubber composition) with the precipitated silica (e.g. with silanol groups on the precipitated silica) and silica coupler (e.g. with siloxane and sulfur moieties of a siloxane/polysulfide based silica coupler) within the rubber composition to form a crosslinked network within the rubber composition and, further, thereafter interacts with a later added sulfur to form additional crosslinks within the rubber composition.

While the complex mechanism, or combination of complex mechanisms, may not be completely understood, it is envisioned that the diazole group of the dimercaptothiadiazole is in a sense a functional group which can interact with the precipitated silica, (e.g. with hydroxyl groups on the precipitated silica) and possibly interact with a siloxane moiety of the silica coupling agent. It is further envisioned that the mercapto group(s) are in a sense functional groups which can interact with conjugated diene-based elastomers, (e.g. with carbon-to-carbon double bonds of a diene-based elastomer). It is additionally envisioned that the mercapto groups are in a sense functional groups which may further interact with the sulfur of a sulfur-containing silica coupling agent. In this manner, then, it is envisioned that a complex network results which aids in coupling the silica reinforcement to the rubber composition.

In practice, it is desired that the mercapto moiety of the dimercaptothiadiazole is protected from prematurely reacting with, for example, the diene-based elastomer and sulfur-containing silica coupling agent until its mercapto group becomes unprotected as a result of an elevated (higher) temperature sulfur curing of the rubber composition, and possibly in the presence of an amine based sulfur cure accelerator. Its mercapto group may be suitably protected, for example, by pre-treatment of the dimercaptothiadiazole prior to its addition to the rubber composition or by treatment of the dimercaptothiadiazole in situ within the rubber composition.

Such pre-treatment, or treatment in situ, of the dimercaptothiadiazole may be accomplished by treatment of the dimercaptothiadiazole to provide a protective group on the mercapto moieties. For example, the dimercaptothiadiazole may be treated with an aromatic carboxylic acid or an aromatic carboxylic acid chloride. In this manner, for example, it is envisioned that an aromatic thiol ester may be formed by an interaction of a mercapto moiety and the aromatic carboxylic acid. Such aromatic carboxylic acid or aromatic carboxylic acid chloride may be a compound comprised of at least one benzene ring in the molecule and at least one carboxylic group conjugated with the benzene ring. Representative of the many various aromatic carboxylic acids are, for example, and not intended to be exhaustive, benzoic acid, naphthenic acid, etc. Benzoic acid or benzoyl chloride are envisioned as being preferred. In this sense, it is envisioned that the benzoic acid reacts with the mercapto group of the dimercaptothiadiazole to thereby protect the dimercaptothiadiazole (protect the mercapto groups of the dimercaptothiadiazole from being chemically active with, for example, sulfur and sulfur-containing silica coupling agent) until the aforesaid sulfur curing of the rubber composition at an elevated temperature. Such sulfur curing may, if desired, be in the presence of an amine based sulfur cure accelerator.

It is therefore envisioned that a complex network of crosslinks are formed in situ within the rubber composition which is comprised of:

(A) crosslinks formed between the precipitated silica, silane coupler and dimercapto groups of the functional group-containing compound, (B) crosslinks formed between sulfur, elastomer, and dimercapto groups of the functional group-containing compound, as well as (C) crosslinks formed between the diene-based elastomer(s) and dimercapto groups of the functional group-containing compound.

It is believed that such redirection of precipitated silica reinforcement of a rubber composition, and resulting article of manufacture having a component comprised of such rubber composition is a significant departure from past practice.

In the description of this invention, the term "phr" relates to parts by weight for a material or ingredient per 100 parts by weight elastomer(s)". The terms "rubber" and "elastomer" may be used interchangeably unless otherwise indicated. The terms "cure" and "vulcanize" may be used interchangeably unless otherwise indicated.

SUMMARY AND PRACTICE OF THE INVENTION

In accordance with this invention a process of preparing a rubber composition is comprised of blending:

(A) at least one conjugated diene-based elastomer;

(B) reinforcing filler comprised of amorphous synthetic silica (e.g. precipitated silica) or a combination of precipitated silica and rubber reinforcing carbon black, (C) sulfur-containing silica coupling agent having a moiety reactive with said precipitated silica and another different moiety interactive with said diene-based elastomer(s)

(D) dimercaptothiadiazole reactive with hydroxyl groups (e.g. silanol groups) contained on said precipitated silica, with said silica coupling agent and with said diene-based elastomer(s), wherein said dimercaptothiadiazole is provided as:

(1) dimercaptothiadiazole pre-treated (e.g. treated prior to its addition to the rubber composition) with an aromatic carboxylic acid chloride (e.g. benzoyl chloride), or (2) dimercaptothiadiazole treated in situ (within the rubber composition) with an aromatic carboxylic acid (e.g. benzoic acid).

In further accordance with this invention said process further comprises blending sulfur with the resultant rubber composition and further comprises sulfur curing the rubber composition at an elevated temperature.

Therefore, in additional accordance with this invention, as rubber composition is provided which is comprised of:

(A) at least one conjugated diene-based elastomer;

(B) reinforcing filler comprised of amorphous synthetic silica (e.g. precipitated silica) and rubber reinforcing carbon black and (C) sulfur-containing silica coupling agent, and (D) dimercaptothiadiazole, wherein said dimercaptothiadiazole is provided as:

(1) dimercaptothiadiazole pretreated with an aromatic carboxylic acid chloride (e.g. benzoyl chloride), or (2) dimercaptothiadiazole treated in situ (treated within the rubber composition) with an aromatic carboxylic acid (e.g. benzoic acid).

In further accordance with this invention said rubber composition further contains sulfur (curative for diene-based elastomer) and the rubber composition is sulfur cured at an elevated temperature.

Such sulfur cured rubber composition is envisioned as contained a complex crosslinked network comprised of:

(A) precipitated silica which contains dimercaptothiadiazole functionalization;

(B) precipitated silica-containing elastomer mixture crosslinked with sulfur-containing silica coupling agent, sulfur, and dimercaptothiadiazole;

(C) elastomer crosslinked with dimercaptothiadiazole functionalized precipitated silica; and (D) conjugated diene-based elastomers crosslinked with sulfur, sulfur-containing silica coupling agent, and dimercaptothiadiazole.

In further accordance with this invention, then, a rubber composition which contains a dimercaptothiadiazole functionalized precipitated silica is provided.

In additional accordance with this invention, said process and said rubber composition is provided with an inclusion of a crosslinkable functional group, namely, the dimercaptothiadiazole, for interaction with said precipitated silica having a moiety reactive with hydroxyl groups (e.g. silanol groups) on said precipitated silica, namely the diazole moiety, including said dimercaptothiadiazole functionalized precipitated silica and another different second moiety, namely a sulfur moiety, interactive with said diene-based elastomer(s).

It is envisioned that such inclusion of the crosslinkable group with a sulfur containing silica coupling agent adds further sulfur network crosslinked complexity to the precipitated silica reinforcement of the rubber composition.

In further accordance with this invention, an article of manufacture, such as for example a tire, is provided having at least one component comprised of said rubber composition. Such tire component may be, for example, at least one of a tire sidewall, tire sidewall insert, tire sidewall apex, ply coat, wire coat, and tread.

Rubber compositions are often prepared by mixing a diene-based rubber, carbon blacks and other rubber compounding ingredients, exclusive of sulfur based rubber curatives, in at least one sequential mixing step with at least one mechanical mixer, usually referred to as "non-productive" mix step, or stage(s), to a an elevated temperature under high shear rubber mixing conditions followed by a final mix step, or stage, in which sulfur based curative(s), such as sulfur and sulfur cure accelerators, are added and mixed therewith at a lower mixing temperature to avoid unnecessarily pre-curing the rubber mixture during the mixing stage. The terms "non-productive" and "productive" mix stages are well known to those having skill in the rubber mixing art.

It is to be appreciated that the rubber composition is conventionally cooled to a temperature below about 40° C. between the aforesaid mix stages.

The silicas employed in this invention are precipitated silicas such as, for example, those obtained by the acidification of a soluble silicate, e.g., sodium silicate, typically in the presence of an electrolyte. Such precipitated silicas are well known to those having skill in such art.

Such precipitated silicas might have, for example, a BET surface area, as measured using nitrogen gas, preferably in the range of about 40 to about 600, and more usually in a range of about 50 to about 300 square meters per gram. A BET method of measuring surface area is described in the *Journal of the American Chemical Society*, Volume 60, understood to include Page 308 in the year 1938.

The silica may also have, for example, a dibutylphthalate (DBP) absorption value in a range of about 100 to about 350, and more usually about 150 to about 300 cc/100 gm.

Various commercially available silicas may be used, for example, only for example herein, and without limitation, silicas commercially available from PPG Industries under the Hi-Sil trademark with designations Hi-Sil 210, 243, etc; silicas available from Rhone-Poulenc, with, for example, designation of Zeosil 1165MP, silicas available from Degussa GmbH with, for example, designations VN2 and VN3, etc and silicas commercially available from Huber having, for example, a designation of Hubersil 8745.

The sulfur-containing silica coupling agent for the precipitated silica reinforcement may be comprised of, for example, a bis(3-trialkoxysilylalkyl)polysulfide containing an average of from about 2 to about 4, although it may alternately be an average of from about 2 to 2.6 or alternately from about 3.4 to about 3.8, connecting sulfur atoms in its polysulfidic bridge.

Alkyl radicals for said alkoxy groups may be comprised of at least one ethyl radical. The alkyl radical may be comprised of, for example butyl, propyl and amyl radicals, preferably a propyl radical.

Representative of such bis(3-trialkoxysilylalkyl)polysulfide coupling agent is a bis(3-trialkoxysilylalkyl)polysulfide comprised of a bis(3-triethoxysilylpropyl)polysulfide.

Alternatively, said coupling agent may be an alkoxyorganomercaptosilane.

The sulfur vulcanizable elastomers (conjugated diene-based elastomers) may be comprised of, for example, at least one of polymers of at least one of isoprene and 1,3-butadiene and copolymers of styrene with at least one of isoprene and 1,3-butadiene.

If desired, at least one of the sulfur vulcanizable elastomers may be comprised of:

(A) a coupled (a polymer-to-polymer coupling, not the aforesaid silica-to-elastomer coupling) comprised of a polymer of at least one of isoprene and 1,3-butadiene and copolymer of styrene with at least one of isoprene and 1,3-butadiene, wherein said coupled elastomer is at least one of tin and silica coupled elastomer, or (B) functionalized elastomer of at least one of styrene/butadiene copolymer elastomer (SBR), c is 1,4-polybutadiene elastomer and cis 1,4-polyisoprene elastomer;

wherein said functionalized elastomer contains functional group(s) comprised of:

(1) amine functional group reactive with said allyl functionalized precipitated silica, or
(2) siloxy functional group reactive with said allyl functionalized precipitated silica filler rubber reinforcement, or
(3) combination of amine and siloxy functional groups reactive with said allyl functionalized silica, or
(4) silane/thiol functional group reactive with said allyl functionalized silica, or
(5) hydroxyl functional groups reactive with said allyl functionalized precipitated silica, or
(6) epoxy groups reactive with said allyl functionalized precipitated silica, or
(7) carboxyl groups reactive with said allyl functionalized precipitated silica.

The following examples are provided to further illustrate the invention in which the amounts and percentages of materials are by weight unless otherwise indicated.

EXAMPLE I

Preparation of and Use of In-Situ Dimercaptothiadiazole Functionalized Silica

Blocked dimercaptothiadiazoles, having their mercapto groups reversibly blocked, were prepared using the method described in U.S. Pat. No. 4,128,510. Benzoyl chloride and benzyl chloride were used as blocking groups for the dimercaptothiadiazole.

A rubber composition containing in situ dimercaptothiadiazole functionalized precipitated silica was prepared (functionalized in situ within the rubber composition).

The following Table A represents the general rubber formulation. The parts and percentages are by weight unless otherwise indicated.

TABLE A

| | Parts |
|---|---|
| Non-Productive Mix Stage (NP) | |
| Solution polymerization prepared styrene/butadiene rubber (S-SBR)[1] | 70 and 0 |
| Emulsion polymerization prepared styrene/butadiene runner (E-SBR)[2] | 70 and 0 |
| Solution polymerized butadiene (cis-PBD)[3] | 30 |
| Fatty acid[4] | 2 |
| Benzyl protected dimercaptothiadiazole[5] | 2.2 and 0 |
| Benzoyl protected dimercaptothiadiazole[6] | 2.3 and 0 |
| Precipitated silica[7] | 65 |
| Sulfur-containing silica coupling agent[8] | 5.2 |
| Rubber reinforcing carbon black[9] | 5.2 |
| Zinc oxide | 3.5 |
| Productive Mix Stage (PR) | |
| Sulfur | 1.2 |
| Sulfur cure accelerators[10] | 2.1 |
| Antioxidant, amine based | 0.75 |

[1]Solution polymerization prepared SBR as Solflex ™ 33H23 from The Goodyear Tire & Rubber Company

[2]Emulsion polymerization prepared SBR as Solflex ™ 1502 from The Goodyear Tire & Rubber Company

[3]Solution polymerization prepared cis-polybutadiene as BUD 1207 ™ from The Goodyear Tire & Rubber Company

[4]Mixture of fatty acids comprised of stearic, palmitic and oleic acids

[5]Prepared as described in U.S. Pat. No. 4,128,510 using benzyl chloride as a protecting group for the mercapto moiety of the dimercaptothiadiazole, thus being referred to as being benzyl protected.

[6]Prepared as described in U.S. Pat. No. 4,128,510 using benzoyl chloride as a protecting group for the mercapto moiety of the dimercaptothiadiazole, thus being referred to as being benzoyl protected.

[7]Precipitated silica as Zeosil ™ 1165 MP from Rhodia

[8]Coupling agent comprised of bis(3-triethoxysilylpropyl) polysulfide having an average of from about 2 to about 2.6 connecting sulfur atoms in its polysulfidic bridge from Evonic Degussa as Si266 ™.

[9]Rubber reinforcing HAF (high abrasion furnace) carbon black as N330, an ASTM designation.

[10]Sulfenamide and tetramethylthiuramdisulfide sulfur cure accelerators

Samples of the rubber compositions were prepared by blending the ingredients in an internal rubber mixer using two separate, sequential, mixing stages, or steps, namely a first non-productive mixing stage (NP) to a relatively high temperature followed by a second, productive mixing stage (PR) to a significantly lower mixing temperature in which the sulfur, sulfur cure accelerator and zinc oxide were added. Such rubber mixing procedure is well known to those having skill in such art.

For the non-productive mixing stage (NP), the ingredients are mixed for about 4 minutes to an autogeneously generated, via the high shear mixing in the internal rubber mixer, drop temperature of about 150° C. at which time the batch is "dropped", or removed, from the associated internal rubber mixer. The batch is sheeted out and allowed to cool to a temperature below 40° C. The batch is then mixed in a productive mixing stage (PR) during which free sulfur, vulcanization accelerator and zinc oxide are added and mixed for a period of about 2 minutes to a drop temperature of about 110° C.

The cure behavior and various cured physical properties of the respective rubber compositions are shown in the following Table 1. For the cured rubber compositions, the rubber compositions were individually cured for about 40 minutes at a temperature of about 150° C.

The rubber compositions are identified as Control rubber compositions A and D, Experimental rubber compositions B, C, E, and F.

TABLE 1

| Materials | Rubber Compositions (phr) | | | | | |
|---|---|---|---|---|---|---|
| | Control A | Exp. B | Exp. C | Control D | Exp. E | Exp. F |
| S-SBR rubber | 70 | 70 | 70 | 0 | 0 | 0 |
| E-SBR rubber | 0 | 0 | 0 | 70 | 70 | 70 |
| Cis 1,4-polybutadiene rubber | 30 | 30 | 30 | 30 | 30 | 30 |
| Benzyl dimercaptothiadiazole (protected) | 0 | 2.1 | 0 | 0 | 2.1 | 0 |
| Benzoyl dimercaptothiadiazole (protected) | 0 | 0 | 2.3 | 0 | 0 | 2.3 |
| MDR[1], 150° C., 60 minutes | | | | | | |
| Maximum less Minimum torque (dNm) | 16.3 | 16.7 | 15.2 | 12.7 | 13.1 | 16.1 |
| ATS[2], Stress-Strain (cured 40 minutes, 150° C.) | | | | | | |
| 100% modulus, ring (MPa) | 7.3 | 7.1 | 8.5 | 7 | 7.7 | 8.9 |
| 300% modulus, ring (MPa) | 14.3 | 13.1 | 15.3 | 14.5 | 15.9 | 15.6 |
| Tensile (break) strength (MPa) | 13.6 | 11.6 | 11.3 | 19.5 | 16.5 | 12.5 |
| Elongation at break (%) | 519 | 497 | 456 | 468 | 572 | 463 |
| Energy to achieve a 300% strain (Joules) | 4.2 | 3.8 | 4.2 | 3.9 | 4.1 | 4.5 |
| RPA[3] (uncured, 8.33 Hertz, 15% Strain, 100° C. | | | | | | |
| Storage modulus (G'), kPa | 335 | 342 | 192 | 311 | 281 | 159 |
| RPA[3] (150 C. cure cycle, 11 Hertz, 10% Strain, 100° C. | | | | | | |
| Storage modulus (G'), kPa | 1568 | 1643 | 1579 | 1494 | 15,338 | 1705 |
| Tan delta | 0.15 | 0.15 | 0.12 | 0.16 | 0.15 | 0.13 |

[1]Rheometer (MDR) instrument
[2]Automated Testing System (ATS) instrument
[3]Rubber Process Analyzer (RPA) instrument It can be seen from Table 1 that the uncured Storage modulus (G') values for the Experimental rubber Compositions C and F containing the benzoyl protected dimercaptothiadiazole of 192 and 159 kPa, respectively, are significantly lower than the uncured G' values for the Control rubber Compositions A and D, without the dimercaptothiadiazole, of 335 and 311 kPa, respectively.

This is considered herein to be indicative of less viscosity build-up and therefore better processing for the Experimental rubber Compositions C and F as a result of containing the benzoyl protected dimercaptothiadiazole.

It can further be seen from Table 1 that the cured G' values for Experimental rubber Compounds C and F of 1579 and 1705 kPa, respectively, which contained the benzoyl protected dimercaptothiadiazole is somewhat similar to the uncured G' values of Control rubber Compounds A and D, which did not contain the dimercaptothiadiazole, of 1568 and 1494 kPa, respectively.

However, it can be seen from Table 1 that the tan delta values of Experimental rubber Compounds C and F of 0.124 and 0.130, respectively, which contained the benzoyl protected dimercaptothiadiazole were significantly lower than the tan delta values for Control rubber Compounds A and D, which did not contain the dimercaptothiadiazole, of 0.151 and 0.158, respectively.

This is considered herein to be significant in the sense of a combination of stiffness (the cured G' values) and tan delta values being an indirect measure of the energy efficiency of the rubber composition. The lower the tan delta value at equivalent stiffness (G') value for the rubber composition, as observed for Experimental rubber Compounds C and F, which contained the benzoyl protected dimercaptothiadiazole, as compared to Control rubber Compounds A and D, the lower the predicted rolling resistance of a tire tread composed of the rubber composition, a beneficial feature for increased fuel economy for the associated vehicle. This observed aspect further the illustrated value of the inclusion of the benzyl protected dimercaptothiadiazole in the rubber composition.

EXAMPLE II

Preparation of In-Situ Functionalized Crosslinked Silica Compound Using Unblocked 2,5-dimercapto-1,3,4-thiadiazole Subsequent studies with protected and unprotected (blocked and non-blocked) thiadiazoles discovered that a pseudo protection (protection of its mercapto moieties created in situ within the rubber composition instead of by pre-treatment before addition to the rubber composition) of the dimercaptothiadiazole could be carried out during the non-productive mixing stage. The exact chemical mechanism for this is not entirely understood at this time.

The general mixing and curing procedure for the rubber compounds was carried out as in Example 1. The formulation is represented in Table B and the rubber composition data in Table 2. The rubber samples are identified as Control rubber Compound G and Experimental rubber Compounds H and I.

TABLE B

| | Parts |
|---|---|
| Non-Productive Mix Stage (NP) | |
| Emulsion polymerization prepared styrene/butadiene runner (E-SBR)[1] | 70 |
| Solution polymerized butadiene (cis-PBD)[2] | 30 |
| Fatty acid[3] | 2 |
| Benzoyl dimercaptothiadiazole (monoprotected)[4] | 0.5 and 0 |
| Benzoyl dimercaptothiadiazole (unprotected) | 0.3 and 0 |
| 2,5-dimercapto-1,3,4-thiadiazole[5] | 0.3 and 0 |
| Benzoic acid[6] | 1.8, 1.5, 0 |
| Precipitated silica[7] | 65 |
| Sulfur-containing silica coupling agent[8] | 5.2 |
| Rubber reinforcing carbon black[9] | 5.2 |
| Zinc oxide | 3.5 |
| Productive Mix Stage (PR) | |
| Sulfur | 1.2 |
| Sulfenamide sulfur cure accelerator | 1.5 |

TABLE B-continued

| | Parts |
|---|---|
| Diphenylguanidine | 1.5 |
| Antioxidant, amine based | 0.75 |

[1] Emulsion polymerization prepared SBR as Solflex™ 1502 from The Goodyear Tire & Rubber Company
[2] Solution polymerization prepared cis-polybutadiene as Budene 1207 from The Goodyear Tire & Rubber Company
[3] Mixture of fatty acids comprised of stearic, palmitic and oleic acids
[4] Obtained as ECHO-A from the Arkema Corp.
[6] Obtained from Sigma-Aldrich
[7] Precipitated silica as Zeosil™ 1165 MP from Rhodia
[8] Coupling agent comprised of bis(3-triethoxypropyl) polysulfide having an average of from about 2 to about 2.6 connecting sulfur atoms in its polysulfidic bridge from Evonic Degussa as Si266™.
[9] Rubber reinforcing HAF (high abrasion furnace) carbon black as N330, an ASTM designation

TABLE 2

| | Rubber Compositions (phr) | | | |
|---|---|---|---|---|
| Materials | Control G | Exp. H | Exp. I | Exp. J |
| Benzoyl dimercaptothiadiazole (monoprotected) | 0 | 0.5 | 0 | 0 |
| Dimercaptothiadiazole (unprotected) | 0 | 0 | 0.3 | 0.3 |
| Benzoic acid | 0 | 1.5 | 1.8 | 0 |
| MDR[1], 150° C., 60 minutes | | | | |
| Maximum less Minimum torque (dNm) | 17.1 | 15.9 | 16.0 | NA* |
| ATS[2], Stress-Strain (cured 40 minutes, 150° C.) | | | | |
| 100% modulus, ring (MPa) | 7 | 8 | 8.5 | NA* |
| 300% modulus, ring (MPa) | 11.8 | 14.5 | 15.1 | NA* |
| Tensile (break) strength (MPa) | 13.2 | 17 | 16.9 | NA* |
| Elongation at break (%) | 331 | 339 | 326 | NA* |
| Energy to achieve a 300% strain (Joules) | 6.1 | 7.1 | 7.2 | NA* |
| RPA[3] (uncured, 8.33 Hertz, 15% Strain, 100° C. | | | | |
| Storage modulus (G'), kPa | 270 | 167 | 182 | NA* |
| RPA[3] (150 C. cure cycle, 11 Hertz, 10% Strain, 100° C. | | | | |
| Storage modulus (G'), kPa | 2192 | 1912 | 1986 | NA* |
| Tan Delta | 0.14 | 0.12 | 0.12 | NA* |

NA*: For the above Experimental Rubber Composition J, the mixed rubber composition was crumbly without a cohesive texture so that the associated tests were not run.

It can be seen from Table 2 that for Experimental rubber Compositions H and I the uncured storage modulus G' values of 167 and 182 kPa, respectively, are significantly lower than the value of 270 kPa for Control rubber Composition G. The lower uncured G' is considered herein to be significant in the sense of the uncured G' related to ease of processing, namely that the lower the storage modulus G' value the easier to process the rubber composition.

It can be further be seen from Table 2 that, for Experimental rubber Compositions H and I, the 300 percent modulus, tensile strength and energy to achieve a 300 percent strain were higher than the values Control rubber Composition G.

This is considered herein to be significant in the sense that the 300 percent modulus, tensile strength, and energy to achieve a 300 percent modulus are all indicative of polymer filler interaction. The higher values represent a higher level of polymer filler interaction. Increased polymer filler interaction is a desired property for abrasion resistance, or resistance to tire read wear.

The data for Experimental rubber compositions H and I in this Example II is seen from Table 2 to be similar to the data from Experimental rubber compositions C and F in Example I. In this sense, the rubber compositions have lower uncured viscosity (Mooney viscosity values) as compared to their respective Control rubber compositions, namely rubber compositions The rubber compositions A and G, respectively with a thereby indicated improved rubber processing along with equivalent or improved cured storage and tensile modulii. This indicates that addition of benzoic acid with the unprotected dimercaptothiadiazole (the 2,5-dimercapto-1,3,4-thiadiazole) acts to protect the dimercaptothiadiazole in situ with the rubber composition by protecting, or blocking, the mercapto functional group of the dimercaptothiadiazole.

Interestingly, it is seen that Experimental rubber composition J, for which the dimercaptothiadiazole was not pretreated nor treated in situ with the benzoic acid, resulted in a formation of rubber crumbs which is envisioned to most likely be due to pre-mature crosslinking by unprotected (blocked) mercapto moieties of the dimercaptothiadiazole.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing a rubber composition by blending:
   (A) conjugated diene-based elastomer consisting of at least one of cis 1,4-polyisoprene, cis 1,4-polybutadiene and styrene/butadiene copolymer;
   (B) reinforcing filler comprised of a combination of precipitated silica and rubber reinforcing carbon black,
   (C) sulfur-containing silica coupling agent as a bis(3-triethoxysilylpropyl)polysulfide containing an average of from about 2 to about 4 connecting sulfur atoms in its polysulfidic bridge,
   (D) a crosslinked network forming compound consisting of dimercaptothiadiazole reactive with hydroxyl groups contained on said precipitated silica, reactive with said silica coupling agent and reactive with said diene-based elastomer(s),
   wherein said dimercaptothiadiazole is a product of dimercaptothiadiazole treated in situ within the rubber composition with an aromatic carboxylic acid.

2. The process of claim 1 wherein at least one of said diene-based elastomers is a functionalized elastomer of at least one of styrene/butadiene copolymer elastomer and cis 1,4-polybutadiene elastomer;
   wherein said functionalized elastomer contains functional group(s) comprised of:
   (A) amine functional group reactive with said precipitated silica, or
   (B) siloxy functional group reactive with said precipitated silica, or
   (C) combination of amine and siloxy functional groups reactive with said precipitated silica.

3. The process of claim 1 wherein sulfur is blended with said rubber combination to cure the rubber composition at an elevated temperature.

4. The process of claim 1 wherein aromatic carboxylic acid is benzoic acid.

5. The process of claim 2 wherein said functionalized elastomer is a functionalized styrene/butadiene copolymer elastomer.

6. The process of claim 2 wherein sulfur is blended with said rubber combination to cure the rubber composition at an elevated temperature.

7. The process of claim 4 wherein sulfur is blended with said rubber combination to cure the rubber composition at an elevated temperature.

8. The process of claim 5 wherein sulfur is blended with said rubber combination to cure the rubber composition at an elevated temperature.

* * * * *